April 2, 1940.　　　E. R. KAST　　　2,195,459
METHOD OF AND APPARATUS FOR FEEDING SHEETS
Filed Aug. 24, 1937　　4 Sheets-Sheet 1

INVENTOR.
EDWARD R. KAST
BY
ATTORNEY

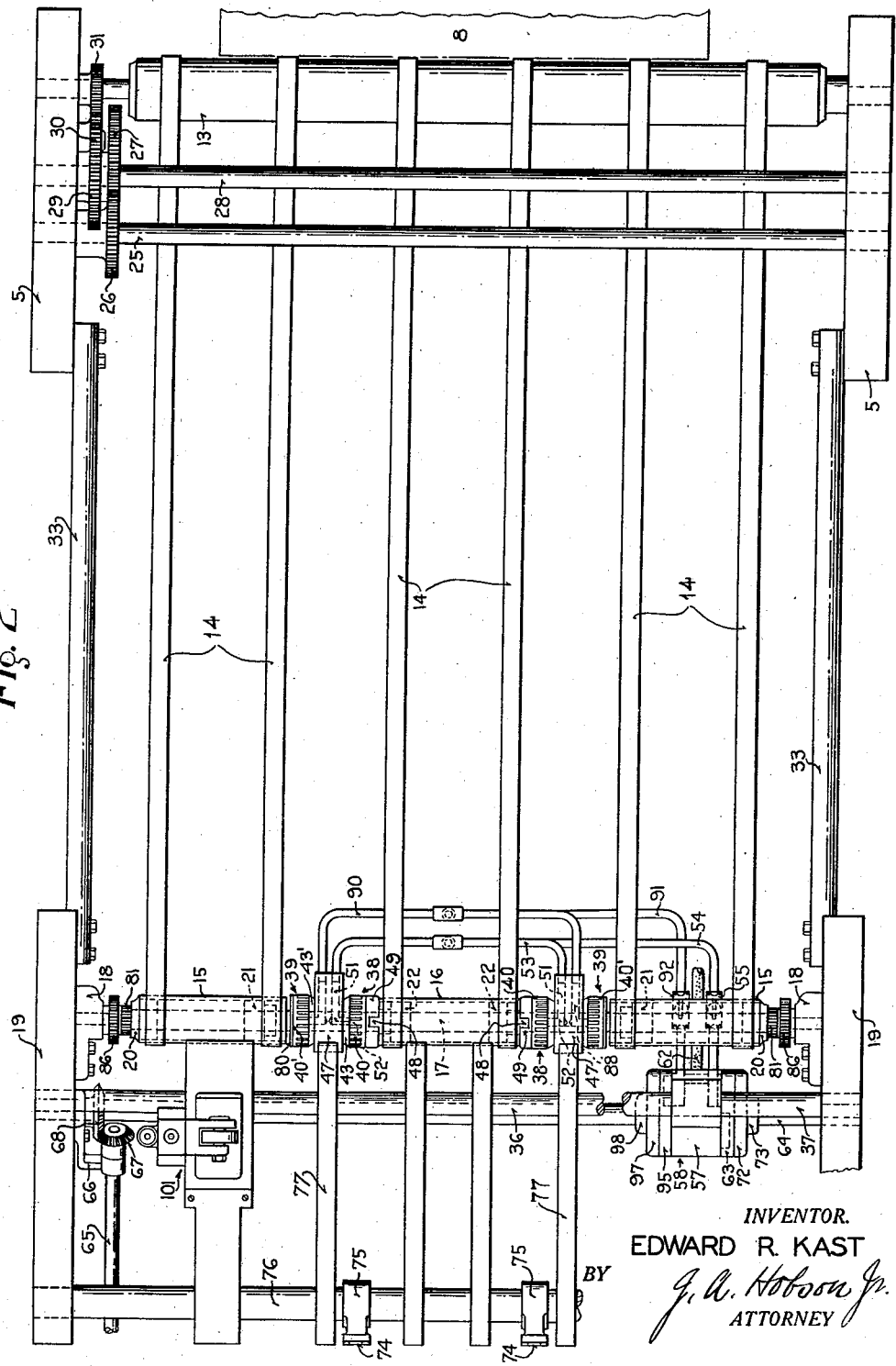

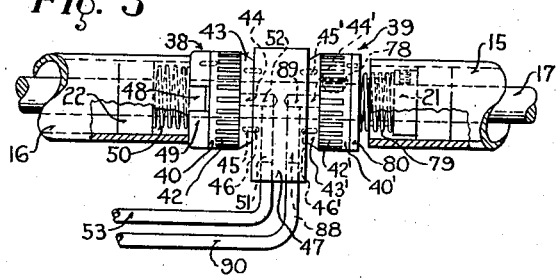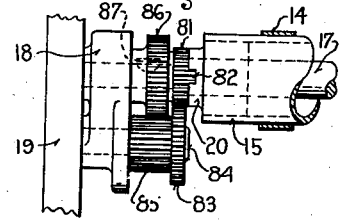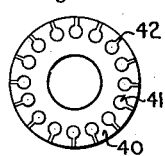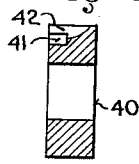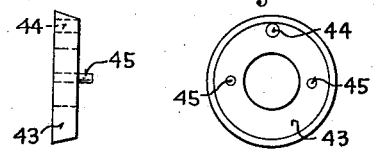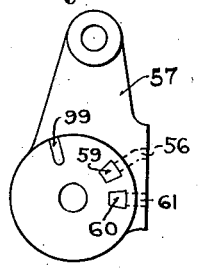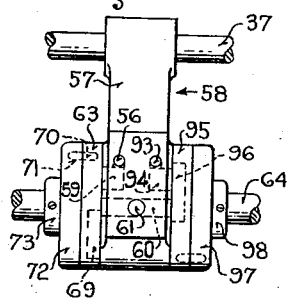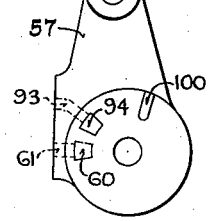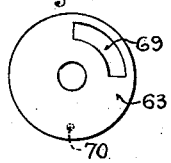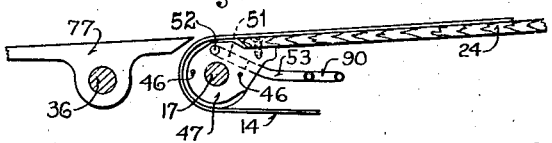

April 2, 1940.   E. R. KAST   2,195,459
METHOD OF AND APPARATUS FOR FEEDING SHEETS
Filed Aug. 24, 1937   4 Sheets-Sheet 4
Fig. 14
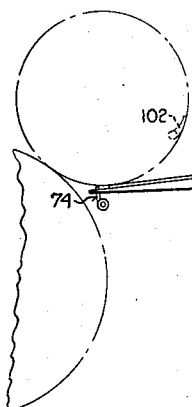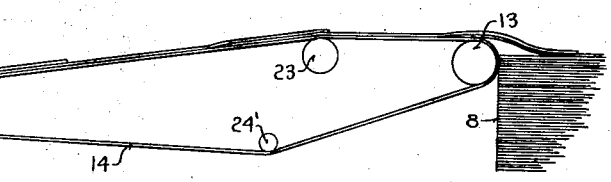
Fig. 15
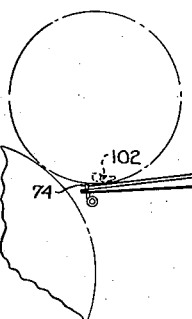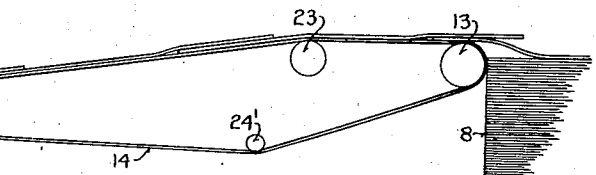
Fig. 16
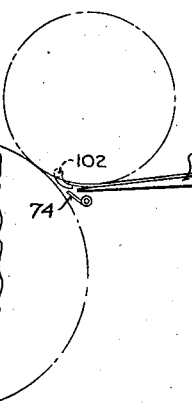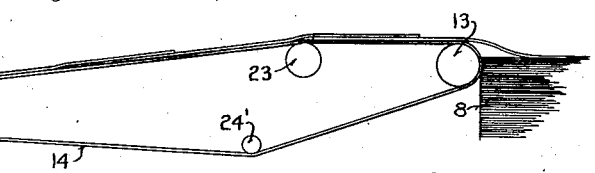
INVENTOR.
EDWARD R. KAST
BY
ATTORNEY Patented Apr. 2, 1940

2,195,459

UNITED STATES PATENT OFFICE 2,195,459

METHOD OF AND APPARATUS FOR FEEDING SHEETS

Edward R. Kast, Pearl River, N. Y., assignor to Dexter Folder Company, New York, N. Y., a corporation of New York Application August 24, 1937, Serial No. 160,589

17 Claims. (Cl. 271—46)

This invention relates to sheet feeders for feeding sheets to printing presses or other machines and while capable of general use is more particularly adapted for feeding sheets in lapped relation to the grippers or other sheet taking devices of the printing press or other instrumentality with which the feeder is associated.

One object of the present invention is to provide a sheet feeder having novel means for controlling the delivery of each sheet to the front stops or registering devices of the printing press.

Another object of the present invention is to provide a sheet feeder having novel means for advancing each sheet under positive control and for retarding each sheet and accurately positioning the same against the front stops or registering devices of the printing press.

Another object of the present invention is to provide a sheet feeder for advancing a bank of lapped sheets to a printing press or other instrumentality and having novel means for holding a succeeding sheet against displacement while a preceding sheet is being taken by the printing press.

Another object of the present invention is to provide a sheet feeder for advancing a stream of sheets in lapped relation to a printing press or other instrumentality and having improved means for retarding the movement of the foremost sheet and delivering said sheet to the front stops or registering devices of said press.

Another object of the present invention is to provide an improved sheet feeder having alternately operated suction devices for positively advancing sheets toward a printing press or other instrumentality and for retarding and delivering each sheet to the front stops or registering devices aforesaid.

These and other objects of the present invention will appear as the following description thereof proceeds and in order to more clearly understand said invention reference may be had to the accompanying drawings which illustrate one embodiment thereof.

In said drawings:

Fig. 2 is a top plan view of said feeder with parts omitted for purposes of clearer illustration;

Fig. 3 is an enlarged top plan view of one set of the suction sheet controlling devices shown in Fig. 2;

Fig. 4 is an enlarged rear elevation showing the drive for certain of said sheet controlling devices;

Fig. 5 is an enlarged side elevation of a suction wheel forming part of the sheet controlling devices shown in Figs. 2 and 3;

Fig. 6 is a vertical transverse sectional view of the suction wheel shown in Fig. 5;

Fig. 7 is an enlarged rear elevation of a suction disc cooperating with each suction wheel;

Fig. 8 is a side elevation of the disc shown in Fig. 7;

Fig. 9 is an elevation of one side of a ported casting forming part of a valve mechanism shown in Figs. 1 and 2;

Fig. 10 is a rear elevation of said valve mechanism;

Fig. 11 is an elevation of the opposite side of the ported casting shown in Fig. 9;

Fig. 12 is a side elevation of one of the vacuum valves shown in Figs. 2 and 10;

Fig. 13 is a side elevation of a suction block shown in Fig. 3; and

Figure 1:
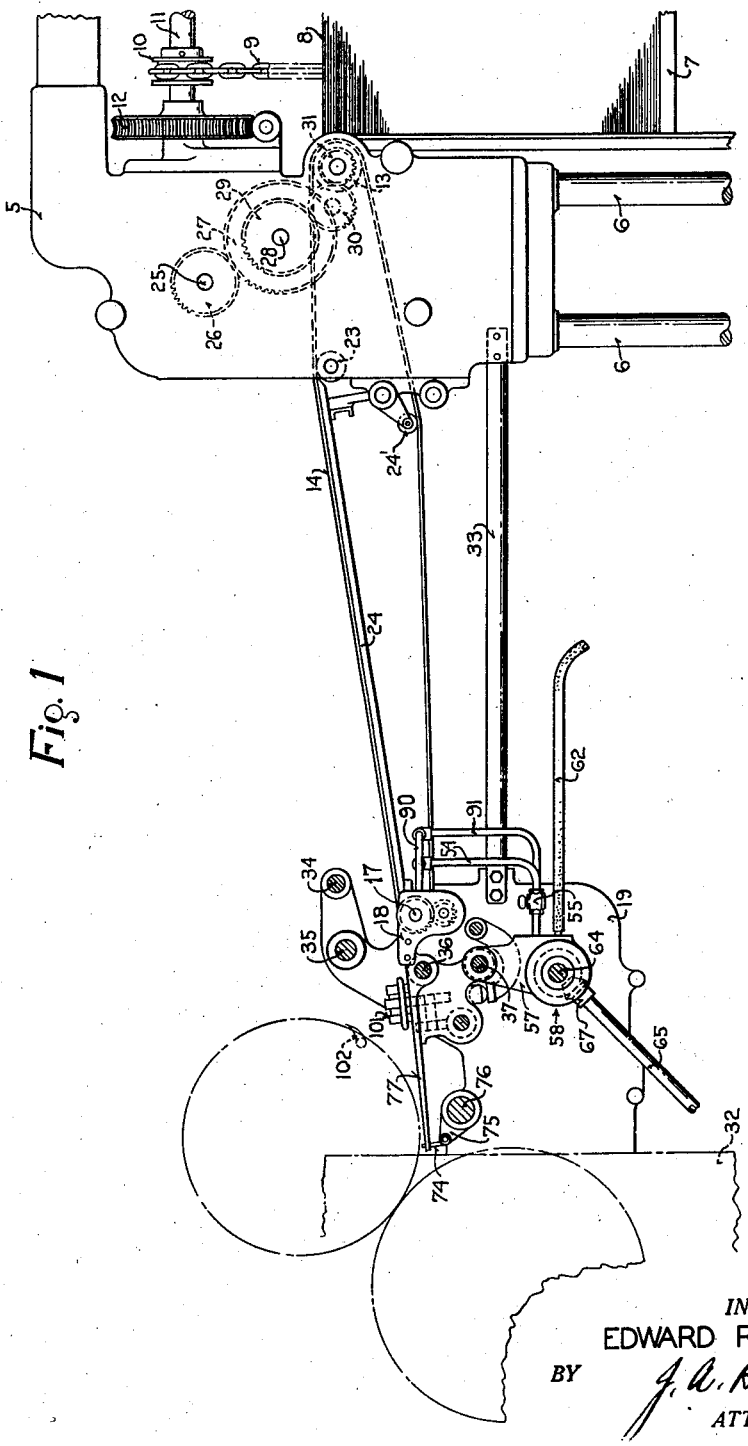
Fig. 1 is a side elevation partly in section of a sheet feeder embodying the present invention.

Figs. 14 to 16 inclusive are side elevations showing diagrammatically the action of the sheet controlling devices on a stream of lapped sheets.

Referring to the drawings wherein like reference characters designate like parts throughout the several views, 5 indicates part of the frame of a feeder which is supported by upright posts or standards 6 and includes a pile elevator comprising a pile board 7 adapted to support a pile of sheets 8. The pile board 7 and pile of sheets 8 thereon are raised intermittently in the usual manner, to keep the top of said pile at a predetermined level, by chains 9 the links of which engage in the teeth of sheaves 10 that are fixed on shafts 11 journalled in suitable bearings on feeder frame 5. The shafts 11 are driven from any suitable source of power by gearing connected therewith and including worm wheels 12 fixed on shafts 11.

The sheets of pile 8 are separated one after another from the top thereof by suitable means (not shown) provided for this purpose. Said sheets are also advanced from the pile, by other suitable means (not shown), in lapped relation one under another, as illustrated in Figs. 14 to 16, to conveying means for carrying the lapped sheets to a printing press or other instrumentality with which the feeder is associated. As herein shown, this conveying means is preferably constructed and operated as follows.

Extending transversely of the feeder and journalled in suitable bearings in the feeder frame 5 is a feed roller 13 around which passes a series of conveyor tapes 14. The front portions of the tapes 14 pass around spaced tubular rollers 15, 15 and 16 (Figs. 2 and 3) which are arranged to rotate freely on a transversely extending shaft 17 that is journalled in suitable bearings in brackets 18 bolted or otherwise suitably secured to front end frames 19.

The tubular rollers 15 are provided at the outer ends thereof with plugs 20 (Figs. 2 and 4) formed with suitable openings through which the shaft 17 extends. The inner ends of the rollers 15 are rotatably supported on collars 21 (Figs. 2 and 3) which are secured to the shaft 17 for a purpose to be hereinafter described. The tubular roller 16 is also provided at opposite ends thereof with plugs 22 formed with suitable openings through which the shaft 17 extends.

The upper reaches of tapes 14 pass over a roller 23 (Fig. 1) journalled in any suitable manner on the feeder frame 5, and also over a forwardly and downwardly extending feed board 24 which is suitably supported at opposite ends thereof on the feeder frame 5 and front end frames 19 respectively. The lower reaches of tapes 14 pass under suitable tape tightening rollers 24' carried by the feeder frame 5.

In accordance with the embodiment of the invention herein shown the sheets are fed in lapped relation to the printing press or other machine to be fed, and for this purpose the conveying tapes 14 for carrying the lapped sheets to the printing press or other instrumentality are continuously driven at a slow speed to enable lapping of the sheets thereon. This slow speed drive for the tapes 14 is preferably effected as follows.

Connected in any suitable manner with the source of power, and driven thereby, is a transversely extending shaft 25 journalled in suitable bearings in the feeder frame 5. Fixed on shaft 25 is a spur gear 26 (Figs. 1 and 2) which meshes with a larger gear 27 that is journalled on a shaft 28 extending transversely of the feeder and fixed in the feeder frame 5. Secured to or formed integrally with the gear 27 is a smaller gear 29 which meshes with an intermediate gear 30 that is journalled in any suitable manner on the feeder frame 5. The gear 30 meshes with a gear 31 that is fixed on the feed roller 13 and which through the described driving connections therefor with the shaft 25 drives the feed roller 13, conveyor tapes 14 and tubular rollers 15, 16 at a slow speed.

The front end frames 19 supports a front end mechanism including sheet controlling devices to be hereinafter described in detail. These front end frames 19 are bolted or otherwise suitably secured to the frames 32 of the printing press or other machine to which the sheets are fed and may, if desired, be connected with the frame 5 of the sheet feeder, as by tie bars 33 which are bolted or otherwise suitably secured to the feeder frame 5 and front end frames 19 respectively. The front end frames 19 are connected together by stay shafts 34, 35, 36 and 37.

The lapped sheets on the feed board 24 and the slow moving tapes 14 are carried forwardly by the latter until the front portion of each sheet reaches the tubular rollers 15 and 16. At this point each sheet, in accordance with the present invention, is acted upon by sheet controlling devices which alternately operate to advance the sheet under positive control toward the printing press or other machine and thereafter retard the movement of said sheet and accurately position the front edge thereof against the front stops or registering devices of the printing press or other machine.

These sheet controlling devices, indicated broadly at 38 and 39, (Figs. 2 and 3) are arranged at opposite sides of the conveyor between the tubular rollers 15 and 16, and are identical as respects their mounting, construction and operation. A description of the sheet controlling devices 38, 39 at one side of the conveyor will therefore be sufficient for the sheet controlling devices 38, 39 at the opposite side of the conveyor. Each sheet controlling device 38 comprises a suction wheel 40 (Figs. 2, 3, 5 and 6) provided at one side thereof near its periphery with a plurality of spaced ports 41 which communicate with a plurality of spaced grooves 42 formed in the periphery of said wheel. The suction wheels 40 are loosely mounted on the shaft 17 and driven at the same surface speed of the tapes 14 in a manner hereinafter described.

Loosely mounted on the shaft 17 adjacent the suction wheels 40 and at the sides thereof in which the ports 41 are formed are discs 43 (Figs. 2, 3, 7 and 8) each provided with a port 44 near its periphery which communicates with the ports 41 in said wheels. The discs 43 are held against rotation by pins 45 suitably secured in said discs and which extend into suitable openings 46 formed in blocks 47 (Figs. 2, 3 and 13) that are loosely mounted on the shaft 17 and bolted or otherwise suitably secured to the underside of the feed board 24 at the forward end thereof.

As previously mentioned the sheet controlling devices 38 are driven at the same surface speed as the surface speed of the tapes 14 for advancing each individual sheet on the conveyor under positive control toward the printing press or other machine. For this purpose the suction wheels 40 are driven from the tubular roller 16 in the following manner. Formed on the opposite ends of the tubular roller 16 are lugs 48 (Figs. 2 and 3) which extend into suitable grooves formed in plates 49 that are secured in any suitable manner to the opposite sides of the suction wheels 40. It will thus appear that the tubular roller 16 which is driven by the tapes 14 will, in turn, drive the suction wheels 40 at the same surface speed as said tapes through the described driving connections for the roller 16 with said wheels. The suction wheels 40 and discs 43 are maintained closely against each other and the adjacent sides of the blocks 47 by springs 50 (Fig. 3) surrounding the shaft 17 and interposed between the plugs 22 and the plates 49.

Vacuum is established in the sheet controlling devices 38 through conduits 51 (Figs. 2, 3 and 13) formed in the blocks 47 at one side thereof and which communicate with ports 52 opening outwardly through said blocks in line with the ports 44 in the discs 43. The conduits 51 have connected therewith opposite ends of a conduit 53 (Fig. 2) which is connected with one end of a conduit 54 that is provided with a valve cock 55 for regulating the vacuum in the sheet controlling devices 38. The opposite end of conduit 54 is connected with a conduit 56 (Figs. 9 and 10) formed in a stationary valve body 57 that is bolted or otherwise suitably secured to the tie shaft 37. The valve body 57 forms part of a valve mechanism indicated broadly at 58 (Figs. 1, 2 and 10) that controls the making and breaking of vacuum in the sheet controlling devices 38, 39 in a manner hereinafter described. The conduit 56 communicates with a port 59 (Figs. 9 and 10) opening outwardly through one side of the valve body 57. Spaced from the port 59 is another port 60 formed in the valve body 57 and opening outwardly through opposite sides thereof. This port 60 communicates with a conduit 61 formed in the valve body 57 and connected with one end of a flexible conduit 62 the opposite end of which is connected with a source of vacuum (not shown).

Making and breaking of vacuum in the sheet controlling devices 38 is controlled by a rotary valve 63 (Figs. 2, 10 and 12) which is loosely mounted on a driven shaft 64 that extends loosely through valve body 57 and is journalled in suitable bearings in the front end frames 19. As herein shown, shaft 64 is driven from the press or other machine in the following manner and makes one revolution for each cycle of operation of the feeder. Extending upwardly and rearwardly from said press or other machine and driven in any suitable manner thereby, is a jack shaft 65 (Figs. 1 and 2) the upper end of which is journalled in a suitable bearing provided by a bracket 66 that is bolted or otherwise suitably secured to one of the front end frames 19. This jack shaft 65 has fixed on the upper end thereof a bevel pinion 67 which meshes with a bevel gear 68 that is fixed on the shaft 64.

The valve 63 is provided on the inner side thereof near its periphery with an arcuate shaped port 69 (Figs. 10 and 12) and on the outer side thereof with an opening 70 into which extends a pin 71. The pin 71 is fixed in a valve driving disc 72 which is keyed or otherwise suitably secured on the shaft 64 and said disc and the valve 63 are maintained closely against each other and the adjacent side of the valve body 57 respectively, by a collar 73 secured in any suitable manner on the shaft 64.

During rotation of shaft 64 the valve 63 through the described driving connections therefor with the driving disc 72 is continuously rotated so that the port 69 passes over the ports 59 and 60 once during each cycle of operation of the feeder thus connecting the conduits 56, 54, 53, and 51 with the source of vacuum. Vacuum is thus created in the suction wheels 40 through the ports 52, 44, 41 and grooves 42 causing the front portion of the leading sheet advanced thereto by the tapes 14 to adhere to said wheels. The sheet adhering to the suction wheels 40 is then advanced through rotation of said wheels under positive control toward the printing press or other machine until the front edge thereof is approximately one half inch away from the front stops or registering devices 74 as illustrated diagrammatically in Fig. 14.

The front stops or registering devices 74 are carried on arms 75 which are secured in any suitable manner on a rock shaft 76 extending transversely of the front end mechanism and journalled in suitable bearings in the front end frames 19. The shaft 76 is oscillated from the press or other machine by suitable means (not shown) to move the front stops or registering devices 74 into and out of the path of the sheets at proper intervals. The front portions of the sheets during their movement from the tapes to the front stops or registering devices 74 are supported by spaced tongues 77 which are secured in any suitable manner on the tie shaft 36.

After the leading sheet is advanced as aforesaid, the control thereof is transferred to the sheet controlling devices 39 which retard the movement of said sheet and accurately position the front edge thereof against the front stops or registering devices. These sheet controlling devices 39 are identical in construction with the previously described sheet controlling devices 38 and have the same reference characters except that in the case of the parts of the sheet controlling devices 39 the reference characters are primed. A detail description of said devices is, under these circumstances, therefore unnecessary.

The sheet controlling devices 39 are preferably mounted and operated as follows. The suction wheels 40' are keyed as at 78 (Fig. 3) to the shaft 17 between the blocks 47 and the ends of the tubular rollers 15. The suction wheels 40' and discs 43' are maintained closely against each other and the adjacent sides of the blocks 47 by springs 79 surrounding the shaft 17 and interposed between the collars 21 and plates 80 that are secured in any suitable manner to said wheels.

As previously mentioned the sheet controlling devices 39 act to retard the advanced sheet and accurately position the front edge thereof against the front stops or registering devices 74. For this reason the suction wheels 40' are driven at a surface speed less than the surface speed of the tapes 14 and suction wheels 40. This drive for the suction wheels 40' is preferably effected as follows. Loosely mounted on the shaft 17 at opposite ends thereof are spur gears 81 (Figs. 2 and 4) provided with lugs 82 which extend into suitable grooves formed in the plugs 20 in the outer ends of the tubular rollers 15. The gears 81 mesh with larger gears 83 journalled on studs 84 that are secured in any suitable manner in the brackets 18. Secured to or formed integrally with the gears 83 are smaller gears 85 which mesh with larger gears 86 that are keyed as at 87 to the shaft 17. It will thus appear that the shaft 17 is driven at opposite sides thereof by the tape driven tubular rollers 15 through the described driving connections therefor with said rollers, and that the shaft 17, in turn, drives the suction wheels 40' at a slower speed than the speed of the tapes 14 and suction wheels 40.

Vacuum is established in the sheet controlling devices 39 through conduits 88 (Figs. 2 and 3) formed in the blocks 47 at the sides thereof adjacent the wheels 40'. The conduits 88 communicate with ports 89 opening outwardly through said blocks in line with the ports 44' in the discs 43'. The conduits 88 have connected therewith opposite ends of a conduit 90 which is connected with one end of a conduit 91 that is provided with a valve cock 92 for regulating the vacuum in the sheet controlling devices 39. The opposite end of conduit 91 is connected with a conduit 93 (Figs. 10 and 11) formed in the stationary valve body 57. The conduit 93 communicates with a port 94 spaced from the port 60 and opening outwardly through the side of the valve body 57 opposite that having the previously described port 59 therein.

The making and breaking of vacuum in the sheet controlling devices 39 is controlled by a rotary valve 95 (Figs. 2 and 10) provided with an arcuate shaped port 96 similar to the port 69 in the rotary valve 63 (Fig. 12). The valve 95 is loosely mounted on the shaft 64 and driven by a disc 97 that is keyed or otherwise suitably secured to said shaft. The disc 97 and valve 95 are maintained closely against each other and the adjacent side of the valve body 57 respectively, by a collar 98 fixed on the shaft 64.

After the leading sheet has been advanced toward the press or other machine by the sheet controlling devices 38, the port 96 during rotation of valve 95 passes over the ports 94 and 60 thus establishing communication between the source of vacuum and the suction wheels 40' through the described connections therefor with the port 94. Vacuum is thus created in the suction wheels 40' causing the sheet which has been under control of the sheet controlling devices 38 to adhere to said wheels and to be carried slowly thereby to the front stops or registering devices 74 as illustrated diagrammatically in Fig. 15. It will of course be understood that when vacuum is created in the wheels 40' of devices 39 vacuum in the wheels 40 of sheet controlling devices 38 is broken to release the sheet therefrom and transfer the control of said sheet to the sheet controlling devices 39 which then continue the forward movement of the sheet but at a reduced speed to accurately position the front edge thereof against the front stops or registering devices 74.

Vacuum is broken in the sheet controlling devices 38 by opening connections therefor with the vacuum conduit 62 to atmosphere. This is preferably effected in the following manner. The port 69 of valve 63 after passing over ports 59, 60 to create vacuum in the sheet controlling devices 38, passes over a port 99 (Fig. 9) that is formed in the valve body 57 and opens outwardly therefrom to atmosphere. At the time the leading end of the port 69 reaches port 99 the opposite end of port 69 is passing over port 59 thus opening to atmosphere all the described conduits connecting the sheet controlling devices 38 with the vacuum conduit 62 and breaking vacuum in said devices.

Likewise when the front edge of the sheet has been positioned against the front stops or registering devices 74 by the sheet controlling devices 39 vacuum is broken in said sheet controlling devices to release said sheet therefrom. This is preferably accomplished as follows. After vacuum is created in the sheet controlling devices 39 as described, and while port 96 of valve 95 is passing over port 94, the leading end of port 96 also passes over a port 100 (Fig. 11) in valve body 57 thus opening to atmosphere all the described conduits connected with the sheet controlling devices 39.

After the forward edge of the sheet has been accurately positioned against the front stops or registering devices 74 by the sheet controlling devices 39 and vacuum in the latter has been broken to release the sheet, said sheet is moved laterally to side register the same with respect to the press or other machine by a side registering device indicated broadly at 101 (Figs. 1 and 2). The mounting, construction and operation of this side registering device 101 is preferably the same as the mounting, construction and operation of the side registering devices disclosed in the application of Edwin W. Goodwin, Serial No. 62,706 filed February 6, 1936 and needs no detail description herein. After the sheet has been side registered, the front stops or registering devices 74 are moved downwardly out of the path of the sheet and said sheet is engaged at the forward end thereof by transfer grippers 102 or other devices and drawn from the conveyor into the printing press or other machine to be further acted upon.

During front and side registering of the leading sheet, the following sheets in lapped relation on the tapes 14 continue to move forwardly. At the time the transfer grippers 102 close on the leading sheet, the sheet controlling devices 38, as shown in Fig. 16, begin to act on the front portion of the succeeding underlying sheet which has previously been advanced into engagement with said devices 38 by the continuously driven slow moving tapes 14. Displacement of the succeeding underlying sheet by the preceding or leading sheet during the withdrawal of the latter from the conveyor is thus prevented. The succeeding sheet is then acted upon by the devices 38, 39 in the same manner as described above in connection with the leading sheet and after being so acted upon is taken by the grippers 102 and removed from the conveyor as in the case of the preceding sheet.

The operation of the sheet feeder will be readily understood from the foregoing and may be briefly summarized as follows. After the sheets are separated from the pile and delivered onto the slow moving tapes 14 in lapped relation, the lapped sheets are advanced toward the printing press or other machine by the tapes until the front portion of the leading sheet engages the tubular rollers 15, 16 and the sheet controlling devices 38, 39. At this time vacuum is created in the sheet controlling devices 38 causing the leading sheet to adhere to said devices which then advance said sheet under positive control and at the same speed of the tapes toward the press or machine until the front edge thereof is approximately one half inch away from the front stops or sheet registering devices 74. At this time vacuum is simultaneously broken in the sheet controlling devices 38 and created in the slower moving sheet controlling devices 39 thus transferring the control of the moving sheet from the sheet controlling devices 38 to the slower moving sheet controlling devices 39. The sheet controlling devices 39 thus act to retard the forward movement of the leading sheet and accurately position the front edge thereof against the front stops or registering devices 74.

After the sheet is accurately positioned at the front stops or registering devices 74 by the sheet controlling devices 39, as described, vacuum is broken in said sheet controlling devices to release the sheet whereupon it is engaged by the side registering device 101 and drawn laterally to side register the same with respect to the printing press or other machine. The side registering device 101 then releases the sheet whereupon the front stops or registering devices 74 are lowered and the sheet is engaged by the transfer grippers 102 and drawn from the conveyor into the printing press or machine with which the feeder is associated. These operations are repeated in the order named once during each cycle of operation for each succeeding sheet, and are so timed that the sheet controlling devices 38 begin to act on the next or underlying sheet before the preceding front and side registered sheet is withdrawn from the conveyor. In this manner the next underlying sheet is not only advanced under positive control toward the front stops or registering devices 74 but is also prevented from being displaced by the preceding sheet during the withdrawal of the same from the conveyor by the transfer grippers 102.

While the present invention is herein illustrated and described in connection with sheet feeders for advancing sheets in lapped relation to a printing press or other instrumentality, it is equally adaptable to sheet feeders wherein the sheets are advanced singly one after another in spaced relation to a printing press or other instrumentality. It is therefore to be expressly understood that the present invention is not limited to the embodiment thereof herein illustrated and described or otherwise than by the terms of the appended claims.

What I claim is:

1. Sheet feeding apparatus for feeding sheets in lapped relation to a predetermined point, and comprising continuously driven means on which the sheets are delivered in predetermined positions, means for further advancing each successive sheet under positive control and while partly covered by a preceding sheet, front registering means, and means for taking control of the advancing sheet from said second named means, moving said sheet at retarded speed into engagement with the front registering means to accurately front register the same, and releasing the sheet when the front edge thereof engages said front registering means.

2. Sheet feeding apparatus for feeding sheets in lapped relation to a predetermined point and at a predetermined speed and comprising continuously driven means on which the sheets are delivered in predetermined position, rotatable means for further advancing each successive sheet under positive control at the same speed as the feeding means and while partly covered by a preceding sheet, front registering means, and means for taking control of the advancing sheet from said rotatable means, moving said sheet at retarded speed into engagement with the front registering means to accurately front register the same, and releasing the sheet when the front edge thereof engages said front registering means.

3. Sheet feeding apparatus for feeding sheets in lapped relation and comprising a slow moving conveyor on which the sheets are delivered in predetermined positions, suction means for seizing each successive sheet while partly covered by a preceding sheet and advancing the successive sheet a predetermined distance, front registering means, suction means for further advancing each successive sheet at retarded speed into engagement with the front registering means to accurately front register the same, and means for controlling the operation of said last named suction means to release each advanced and retarded sheet when it engages said front registering means.

4. Sheet feeding apparatus for feeding sheets in lapped relation to a predetermined point and comprising a slow moving conveyor on which the sheets are delivered in predetermined positions, suction means operating at the same speed as that of the conveyor adapted to seize and continue the advance of each successive sheet while it is partly covered by a preceding sheet and to hold the successive sheet against displacement during the withdrawal of a preceding sheet therefrom, front registering means, slower moving suction means for further advancing each successive sheet at retarded speed into engagement with the front registering means to accurately front register the same, and means for controlling the operation of the slower moving suction means so that each advanced and retarded sheet is released thereby when it engages the front registering means.

5. Sheet feeding apparatus for feeding sheets in lapped relation to a predetermined point and comprising a slow moving conveyor on which the sheets are delivered in predetermined positions, a set of suction devices for seizing the front portion of an advanced sheet while it is partly covered by a preceding sheet and for further advancing the seized sheet to another predetermined point, front registering devices, a set of suction devices for seizing the sheet advanced by the first set of suction devices and for further advancing said sheet and retarding the movement thereof to accurately position the front edge of the sheet against said front registering devices, and means for controlling the operation of the two sets of suction devices in proper timed relation with each other and for causing the second set of suction devices to release the sheet when the front edge thereof engages said front registering devices.

6. Sheet feeding apparatus for feeding sheets a predetermined distance toward a printing press or other machine and comprising a conveyor on which the sheets are placed in predetermined positions, suction means for further advancing each sheet under positive control and at the same speed imparted thereto by said conveyor, suction means arranged coaxially with said first named suction means and moving at a slower and uniform speed for advancing the sheet under positive control and for retarding the movement thereof to accurately front register the same, and means for controlling the operation of the two suction means in proper timed relation with each other and for causing the slow moving suction means to release each sheet when it is front registered.

7. Sheet feeding apparatus for continuously advancing sheets at a predetermined speed and comprising a conveyor on which the sheets are placed in predetermined positions, suction means for seizing each sheet and continuing the advance thereof to a predetermined point, means for operating said suction means at the same speed as that of the conveyor, front registering means, suction means arranged coaxially with said first named suction means and moving at a slower and uniform speed for engaging the sheets when they are released by the first named suction means, retarding the movement of each sheet advanced by the first named suction means, and for accurately positioning the front edge of each sheet against the front registering means, and means for causing the slower moving suction means to release each sheet when the front edge thereof engages said front registering means.

8. Sheet feeding apparatus for continuously advancing sheets to a predetermined point and comprising a conveyor driven at a predetermined speed and on which the sheets are placed in predetermined positions, rotating suction means adapted to seize each sheet and continue the advance thereof to another predetermined point, means for rotating said suction means at the same speed as that of the conveyor, front registering means, a second rotating suction means arranged coaxially with the first named suction means for taking the sheet advanced by the first named suction means and delivering said sheet to the front registering means, means for rotating the second suction means at a uniform speed less than that of the first named suction means so as to accurately position the front edge of the sheet against said front registering means, and means for making and breaking vacuum in the two suction means in proper timed relation with each other and for causing the slower moving suction means to release each sheet when the front edge thereof engages the front registering means.

9. In a sheet feeding apparatus, a conveyor including spaced elements for conveying sheets placed thereon in predetermined positions to a predetermined point, suction means arranged between the spaced elements in coaxial relation therewith and adapted to seize each sheet and further advance the same, other suction means arranged between said elements in coaxial relation therewith and adapted to seize each advanced sheet, retard the movement thereof so as to accurately front register the same, and release each sheet when it is front registered, and means for controlling the operation of the two suction means in proper timed relation with each other.

10. In a sheet feeding apparatus, a conveyor including a plurality of axially spaced rollers for conveying sheets placed thereon in predetermined positions to a predetermined point and at a predetermined speed, one or more suction wheels arranged between said rollers coaxially therewith and adapted to seize each sheet and further advance the same, means for driving said suction wheel or wheels from one of said rollers at the same speed thereof, another suction wheel or wheels arranged between said rollers coaxially therewith and adapted to seize the advanced sheet, further advance said sheet, and retard the movement thereof, means for driving said last named suction wheel or wheels from another of said rollers at a reduced speed, and valve means for controlling the operation of said first and last named suction wheels and for causing the last named suction wheel or wheels to release the sheet after the same is retarded thereby.

11. In a sheet feeding apparatus, a conveyor including a plurality of tapes and coaxially spaced rollers driven thereby for advancing sheets placed thereon in predetermined positions toward a machine to be fed, suction wheels arranged between said rollers coaxially therewith and adapted to seize and continue the advance of each individual sheet to a predetermined point, connections between the suction wheels and one of said rollers for driving said suction wheels at the same speed thereof, other suction wheels arranged between said rollers coaxially therewith and adapted to take the sheet from the first named suction wheels and advance the sheet to a position where it is registered, connections between the last named suction wheels and another of said rollers for driving said last named suction wheels at a reduced speed to retard the movement of the sheet to said position, and valve controlled means for making and breaking vacuum in said suction wheels at proper intervals so that the sheet during its movement from the conveyor to registry position is at all times under the control of at least one or more of said suction wheels, and for causing the second named suction wheels to release the sheet when said sheet is in registry position.

12. In a sheet feeding apparatus, a conveyor including a plurality of tapes and spaced tubular rollers driven thereby for advancing sheets placed thereon in predetermined positions toward a machine to be fed, a shaft on which said tubular rollers are rotatably mounted, a pair of suction wheels loosely mounted on said shaft between the tubular rollers and adapted to seize each individual sheet and advance it a predetermined distance, connections between the suction wheels and one of said tubular rollers for driving said suction wheels at the same surface speed as the tapes, front registering devices, a second pair of suction wheels arranged between the tubular rollers and fixed on said shaft for taking the sheet from the first named suction wheels and further advancing said sheet to the front registering devices, gearing connected with the shaft and another of said tubular rollers for driving said shaft and the last named suction wheels at a surface speed less than the surface speed of the first pair of suction wheels, and a valve mechanism for making and breaking vacuum in each pair of suction wheels at proper intervals to transfer the control of said sheet from one pair of suction wheels to the other pair of suction wheels, and for breaking vacuum in the second pair of suction wheels when the sheet advanced thereby reaches the front registering devices.

13. The method of feeding sheets to a machine, which consists in feeding the sheets one after another from a supply and delivering them in predetermined positions to form a stream of lapped sheets, continuously advancing the stream of lapped sheets toward the machine, seizing each succeeding sheet while it is partly covered by a preceding sheet and advancing the seized sheet under positive control to a predetermined point, again seizing the sheet and advancing it with retarded movement and under positive control into accurate front registry position, and releasing the sheet when it reaches said front registry position.

14. The method of feeding sheets to a machine, which consists in feeding the sheets one after another from a supply and delivering them in predetermined positions to form a stream of lapped sheets, continuously advancing the stream of lapped sheets at slow speed toward the machine to a predetermined point, seizing each succeeding sheet while it is partly covered by a preceding sheet, advancing it under positive control and at the same speed to another predetermined point, and holding the successive sheet against displacement during withdrawal of a preceding sheet therefrom, again seizing the sheet and advancing it at slower speed and under positive control into accurate front registry position, and releasing the sheet when it reaches said front registry position.

15. The method of feeding sheets to a machine, which consists in continuously feeding the sheets one after another from a supply and delivering them in predetermined positions to form a stream of lapped sheets forwardly thereof, continuously moving the stream of lapped sheets toward the machine at slow speed, seizing each succeeding sheet while it is partly covered by a preceding sheet and advancing the seized sheet under positive control and at the same speed to a predetermined point, again seizing the sheet and advancing it at slower speed and under positive control into accurate front registry position, and releasing the sheet when it reaches said front registry position.

16. The method of feeding sheets to a machine, which consists in feeding the sheets one after another from a supply and delivering them in predetermined positions to form a stream of lapped sheets, continuously advancing the stream of lapped sheets toward the machine, seizing each succeeding sheet by suction while it is partly covered by a preceding sheet and advancing the seized sheet under positive control to a predetermined point, then seizing the advancing sheet by suction and further advancing it with retarded movement and under positive control into accurate front registry position, and releasing the sheet when it reaches said front registry position.

17. The method of feeding sheets to a machine, which consists in feeding the sheets one after another from a supply and delivering them in predetermined positions to form a stream of lapped sheets, continuously advancing the stream of lapped sheets at slow speed toward the machine to a predetermined point, seizing each succeeding sheet by suction while it is partly covered by a preceding sheet and advancing the seized sheet under positive control and at the same speed to another predetermined point, again seizing the sheet by suction and advancing it at slower speed and under positive control into accurate front registry position, and releasing the sheet when it reaches said front registry position.

EDWARD R. KAST.